United States Patent

[11] 3,591,285

[72] Inventor Shige Hakogi
 Kawasaki-shi, Japan
[21] Appl. No. 759,137
[22] Filed Sept. 11, 1968
[45] Patented July 6, 1971
[73] Assignee Nihon Kykumen Insatsuki Kabushiki Kaisha
 Tokyo, Japan
[32] Priority Sept. 13, 1967
[33] Japan
[31] 42/58786

[54] METHOD AND APPARATUS FOR PHOTO PRINTING ON CURVED SURFACE ARTICLE
6 Claims, 10 Drawing Figs.

[52] U.S. Cl. ..................................................... 355/91, 355/132
[51] Int. Cl. .............................................. G03b 27/20
[50] Field of Search............................................ 355/91, 92, 93, 94, 132

[56] References Cited
UNITED STATES PATENTS
2,437,229  3/1948  Mears........................... 355/92
3,087,404  4/1963  Hase et al. .................... 355/94 (X)

Primary Examiner—Samuel S. Matthews
Assistant Examiner—Richard L. Moses
Attorney—Waters, Roditi, Schwartz & Nissen ABSTRACT: A method and apparatus for photo printing on the curved surface of an article, wherein a pliable and transparent negative has a peripheral flange portion supported by a holding member which cooperates with a receiving member supporting the article to be printed, such that the flange portion of the negative is clamped between the holding member and receiving member in airtight relation and an enclosed space is formed between the negative and the curved surface of the article to be printed. Thereafter, the air from the enclosed space is evacuated via a tube supported in the receiving member and in communication with said enclosed space, while atmospheric air is applied to the outer surface of the negative via the holding member. As a consequence, the negative is caused by closely contact the curved surface of the article, afterwhich the holding member is removed and replaced by a light source which exposes the outer surface of the negative to produce photo printing on the curved surface of the article, which is closely contacted by the negative.

INVENTOR

BY Shige Makogi

ATTORNEY

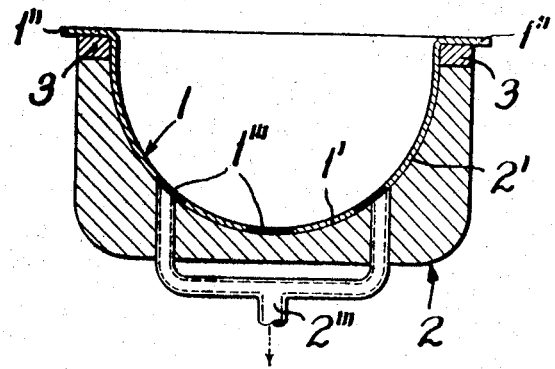
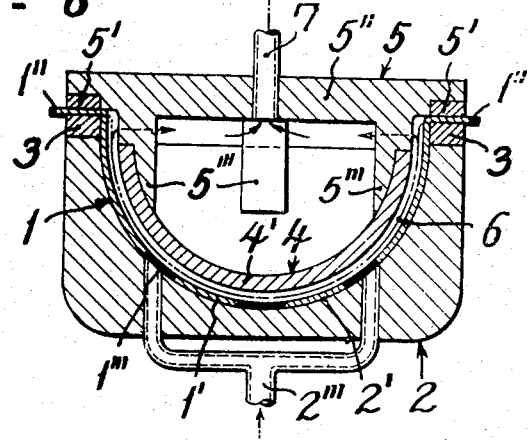
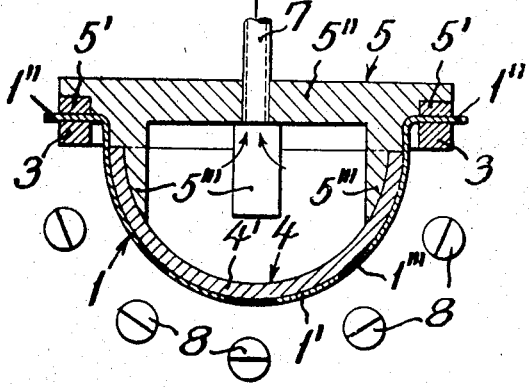

INVENTOR
BY *Shige Hakogi*
ATTORNEY

METHOD AND APPARATUS FOR PHOTO PRINTING ON CURVED SURFACE ARTICLE

BRIEF SUMMARY OF THE INVENTION

The invention relates to methods and apparatus for photo printing on various curved surfaces, i.e., a concave surface, a convex surface, or a combination of concave and convex surfaces.

According to the invention, a pliable and transparent negative is placed adjacent the curved surface of the article to be printed. A peripheral flange is formed on the negative in a region thereof outside the image on the negative and the flange is clamped in airtight-sealing relation with the article to produce an enclosed space between the article and the negative. The enclosed space is evacuated while atmospheric pressure is applied to the negative, to cause the negative to closely contact the curved surface of the article. Thereafter, the outer surface of the negative is exposed to effect photo printing on the curved surface of the article which is closely contacted by the negative.

In further accordance with the invention, the negative is supported by a holding member, which engages the peripheral flange of the negative, while the article is supported by a receiving member. The peripheral flange of the negative is clamped between the holding member and the receiving member to form said enclosed space. The suction pressure is applied to the space by means of a conduit supported in the receiving member, while the atmospheric pressure is applied to the negative, via a duct supported in the holding member.

In order to effect application of the negative to a surface having both convex and concave portions, equal suction pressures are applied to both surfaces of the negative in order to leave the negative in undeformed state and to evacuate the enclosed space. After this evacuation has been completed, the suction pressure on the outer surface of the negative is terminated, and such outer surface is subjected to atmospheric pressure whereby the negative is caused to closely contact both the convex and concave portions of the surface of the article on which photo printing is to be effected.

BRIEF DESCRIPTION OF THE DRAWING

FIGS. 5 to 7 are sectional side views showing various stages of photo printing on a convex surface of an article.

DETAILED DESCRIPTION

Figure 1:
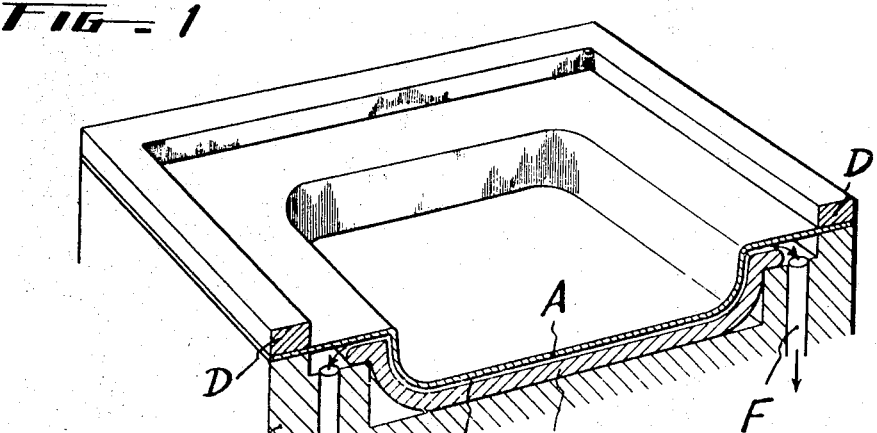
FIG. 1 is a perspective view in section showing an embodiment which illustrates the basic principle of this invention.

The principle of this invention will be first explained with reference to FIG. 1. As will be understood from this Figure, there is used a negative A having a swollen portion in conformity with the curved surface of an article B to be printed and at the periphery of the negative A is a flange portion of substantial width. The swollen portion is placed along the curved surface portion of the article B and at the same time the peripheral flange portion of the negative A is clamped between a receiving member C for the article B and a holding member D for the negative A to form an airtight chamber E between the article B and the negative A. The swollen portion of the negative A is brought into close contact with the curved surface of the article B by evacuation of the air within the chamber E through an air conduit F, and then the negative A is exposed at its outer surface to effect printing on the article B.

Next will be described a method and apparatus for printing on a concave surface of an article, with reference to FIGS. 2—4.

Figure 2:
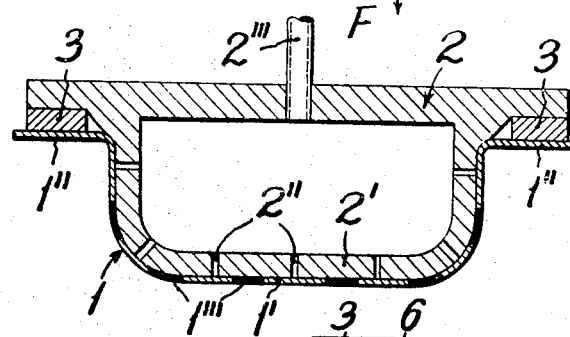
FIGS. 2 to 4 are sectional side views showing various stages of photo printing on a concave surface of an article.

FIG. 2 shows a negative 1 and a negative holding member 2, the negative 1 being composed of a swollen portion 1' adapted to conform with a concave surface of an article to be printed, and a flange portion 1" at the periphery of the negative. The swollen portion 1' is provided with a picture image 1''' by means of printing, photo film-attaching or the like. The negative is made of a pliable and transparent material.

The holding member 2 has a hollow convex portion 2', provided with several air conducting openings 2" and an air conduit 2''' is mounted in member 2. The swollen portion 1' of the negative 1 is mounted on convex surface portion 2' of the holding member 2 in preparation for the next operation, and the holding member 2 can also be used for safe maintenance of the negative at other times than the time of operation.

Figure 3:
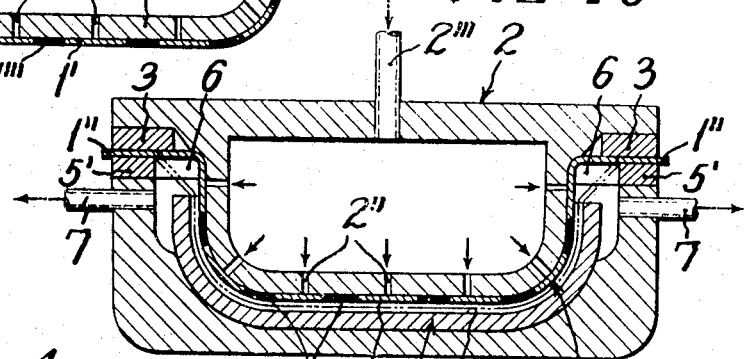

As shown in FIG. 3, the holding member 2 carrying the negative 1 is inserted into a boxlike receiving member 5 containing, in a concave portion 4' thereof, an article 4. The swollen portion 1' of the negative 1 is placed in opposition to the concave surface 4', which has previously been rendered photosensitive by application of a sensitizer on the article or by any other suitable treatments. The annular flange portion 1" of the negative 1 is clamped between a peripheral edge member 5' of the receiving member 5 and the holding member 2 through an annular pressure member 3 to form a space around the article 4 extending into an airtight chamber 6. Then, the air around the article is evacuated by drawing the air through an air conduit 7 in the receiving member 5 and, at the same time, in proportion to the negative pressure within the airtight chamber 6, a positive pressure is applied to the inner surface of the swollen portion 1' of the negative 1 by admission of air through conduit 2''' and openings 2". Consequently, as shown in chain lines in FIG. 3 the swollen portion 1' is brought into close contact with the photosensitive concave surface 4' of the article 4.

Figure 4:
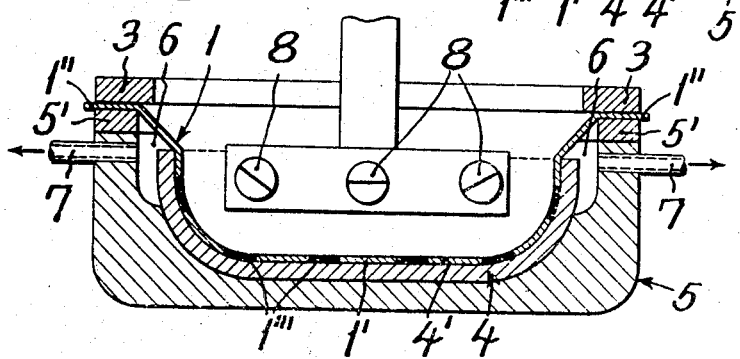

Then, as shown in FIG. 4, the holding member 2 is removed from the receiving member 5, while the pressure member 3 is left as is, and the swollen portion 1' of the negative 1 is still kept in close contact with the concave surface 4' of the article 4 by the negative pressure within the airtight chamber 6 and the atmospheric pressure acting on the inner surface. A light source 8 is inserted into the space from which the holding member 2 has been removed so as to effect photo printing of the image 1''' of the negative onto the concave surface 4' of the article 4.

Next, the operation for printing an image on an article with a convex surface will be explained with reference to FIGS. 5 to 7. Elements similar to those in FIGS. 2—4 are designated by the same reference characters.

The holding member 2 in FIG. 5 is of bowl shape and has a concave portion 2' adapted to conform with the convex surface of the article to be printed. An air conduit 2''' is in communication with the interior of the concave portion 2', and the swollen portion 1' of the negative 1 is mounted on concave portion 2' in preparation for the next operation. The relation between the negative 1 and the holding member 2 is almost the same as in the arrangement in FIGS. 2—4.

The holding member 2 with the negative 1 mounted therein receives the receiving member 5 for the article 4, (whose convex surface 4' is of photosensitive character) as shown in FIG. 6, but the receiving member 5 in this case is of the type having a baseplate 5" with a plurality of spaced receiving elements 5''' projecting therefrom. An air conduit 7 extends through base 5" and opens into the interior of receiving member 5.

The receiving member 5, with the article 4 mounted thereon, is inserted into holding member 2, and the flange portion 1" of the negative 1 is clamped between a peripheral edge member 5' of the receiving member 5 and the holding member 2 through the annular member 3 to form airtight chamber 6 around article 4. This is similar to the arrangement in FIGS. 2—4.

Then, the air between the article 4 and the negative 1 is removed by drawing the air from the airtight chamber 6 through the air conduit 7 by utilizing the space between the receiving elements 5''' and, at the same time, a positive pressure is applied to the outer surface of the negative 1 through the air conduit 2''' in the holding member 2, so that the swollen portion 1' is brought into close contact with the convex surface 4' of the article 4.

Then, the receiving member 5 is separated from the holding member 2 while the swollen portion 1' of the negative 1 remains in close contact with the convex surface 4' of the article 4 as shown in FIG. 7, whereafter exposure is effected by a light source 8 from outside the negative 1 to achieve photo printing on the article 4.

Figure 8:
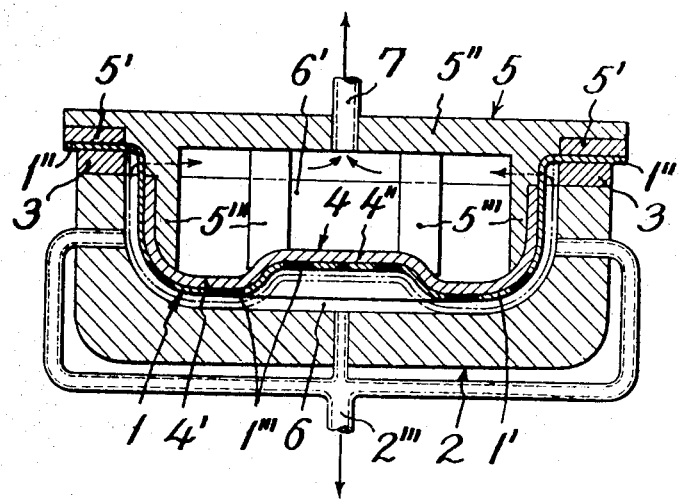
FIG. 8 is a sectional side view of apparatus for photo printing on an article having a combined convex and concave surface.

FIG. 8 shows a printing operation on an article having both concave and convex surfaces 4' and 4'' respectively in the same surface. If, in such a case, the swollen portion 1' of the negative 1 is brought into contact with the work surface 4' by only negative or positive pressure on one side as in the previous arrangements, there would be caused a condition where the air within the concave portion 4'' cannot be evacuated, with the result that the concave portion 4'' is covered by the negative 1, and accordingly the negative 1 can not be brought into contact with the concave portion 4'' and an accurate printing operation becomes impossible.

If, however, after the swollen portion 1' of the negative 1 is held in the concave portion 2' of the holding member 2 and the flange portion 1'' of the negative 1 is clamped as shown in FIG. 8, and equal negative pressures are applied through air conduits 2''' and 7 to the interior of airtight chambers 6 and 6' formed on both sides of the negative 1, due to the balance of the pressures of these chambers 6 and 6' the negative 1 is not applied against convex portion 4' and hence the negative will never cover the concave portion 4''. If conduit 2''' is then subjected to a positive pressure, the negative 1 will be urged into close contact with the work surface 4 including concave portion 4''. The receiving member 5 and the holding member 2 are then separated in preparation for the next step of photo printing.

The contact process in the arrangement in FIG. 8 can be called a double-vacuum system in comparison with the single vacuum systems in the previous arrangements.

Figure 9:
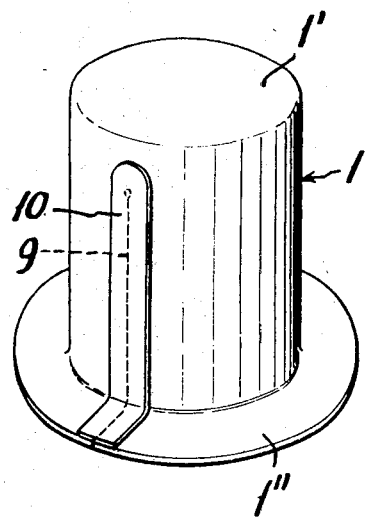
FIG. 9 is a perspective view of a form of a negative.
Figure 10:
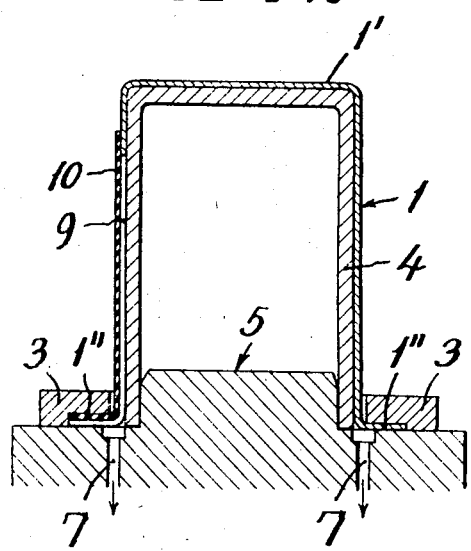
FIG. 10 is a sectional side view of the negative of FIG. 9 in a position for a printing operation.

When a film comparatively small in pliability, such as, a vinyl chloride film, or the like, is used for the material of the negative 1, it is difficult to bring it into close contact with an article having a large degree of curvature. If, however, the negative 1 is provided with a slit 9, and a thin rubber film of substantial elasticity is adhered to the film along the slit 1, as shown in FIG. 9, the negative 1 can be easily brought into close contact with surfaces of article 4 having large curvatures as shown in FIG. 10. This is achieved by the expansion of the slit 9 and the elastic property of the rubber thin film 10.

Thus, according to this invention, there is used a negative with a swollen portion in conformity with a curved surface of an article to be printed such that close contact of the negative with the curved surface is achieved. Additionally, there is provided at the periphery of the swollen portion of the negative, a flange portion, so that it becomes extremely easy and simple to form an airtight chamber around the article by utilizing said flange portion, and close contact of the film with the article can be effected by evacuating the interior of the airtight chamber, whereby a fine pattern can be clearly printed on the curved surface of the article.

What I claim is:

1. A method for photo printing on the curved surface of an article, said method comprising placing a pliable and transparent negative adjacent the curved surface of an article to be printed, forming a peripheral flange on the negative in a region thereof outside the image on the negative, clamping the flange of the negative in airtight-sealing relation with the article to produce an enclosed space between the article and the negative, evacuating said enclosed space while applying atmospheric pressure to the negative to cause the negative to closely contact the curved surface of the article, exposing the negative, on its outer surface, to produce photo printing on the curved surface of the article which is closely contacted by the negative, and supporting the negative by a holder until said space is evacuated and the negative is brought into close contact with the curved surface of the article, whereafter the holder is removed and a light source is introduced into the space formerly occupied by the holder whereby to expose the negative.

2. A method for photo printing on the curved surface of an article, said method comprising placing a pliable and transparent negative adjacent the curved surface of an article to be printed, forming a peripheral flange on the negative in a region thereof outside the image on the negative, clamping the flange of the negative in airtight-sealing relation with the article to produce an enclosed space between the article and the negative, evacuating said enclosed space while applying atmospheric pressure to the negative to cause the negative to closely contact the curved surface of the article, exposing the negative, on its outer surface, to produce photo printing on the curved surface of the article which is closely contacted by the negative, said curved surface of the article having both convex and concave portions, subjecting the negative to equal suction pressures on opposite sides thereof whereby the negative remains undeflected and in spaced contact with the surface while air is removed from said enclosed space, and applying atmospheric pressure to the outer surface of the negative after the enclosed space has been evacuated while continuing to apply suction pressure to said space whereby the negative now enters into close contact with both the convex and concave portions of the curved surface.

3. Apparatus for photo printing on the curved surface of an article, said apparatus comprising a pliable and transparent negative having a swollen portion and a peripheral flange portion, a holding member supporting said negative at said flange portion, a receiving member supporting the article to be photo printed and including a peripheral edge portion which cooperates with said holding member to clamp the flange portion of the negative therebetween in airtight relation and form an enclosed space between the swollen portion of the negative and the curved surface of the article to be printed, means for evacuating the air from said enclosed space, means for the application of atmospheric air to the surface of the negative opposite said space whereby when the air is evacuated from said space the swollen portion of the negative is urged into close contact with the curved surface of said article, and means for illuminating the outer surface of the negative with said holding member removed, and while the negative is in close contact with the curved surface of the article, said curved surface of the article including a convex portion and said holding member having a concave surface against which the negative is engaged, said means for the application of atmospheric air to the negative including a duct connected to atmosphere, and supported in said holding member in communication with said surface of the negative opposite said enclosed space.

4. Apparatus as claimed in claim 3, wherein said evacuating means comprises a conduit supported by said receiving member and adapted for connection to a suction source, said receiving member including spaced projections against which the article is engaged, the spaces between the projections providing passage for evacuation of air from said space to said conduit.

5. Apparatus as claimed in claim 4, wherein said curved surface of the article includes a concave portion in addition to the convex portion, said duct in the holding member being connectable with the suction source, prior to connection with the atmosphere, and concurrently with the conduit in the receiving member whereby equal suction pressures are applied to opposite sides of the negative while the enclosed space is being evacuated.

6. Apparatus as claimed in claim 3, wherein said negative has a slit and an elastic member covering said slit and coextensive therewith to facilitate deformation of the negative and accommodation with the curved surface of the article.